United States Patent Office 3,384,638
Patented May 21, 1968

3,384,638
ANTHRAQUINONE VAT DYESTUFFS
Konrad Mix, Frankfurt am Main-Fechenheim, Germany, assignor to Cassella Farbwerke Mainkur Aktiengesellschaft, Frankfurt am Main-Fechenheim, Germany, a company of Germany
No Drawing. Filed Feb. 15, 1966, Ser. No. 527,479
Claims priority, application Germany, Mar. 3, 1965, C 35,205
1 Claim. (Cl. 260—249)

This invention relates to new and valuable anthraquinone vat dyestuffs.

More particularly, this invention relates to vat dyestuffs of the anthraquinone series having the formula

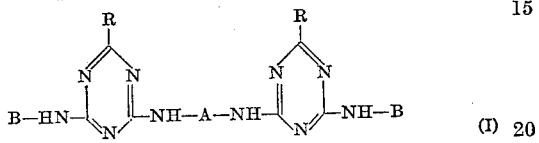

wherein —NH—A—NH— is a bivalent residue of a diamino anthraquinone of the group consisting of 1,4-diamino-anthraquinone, 1,5-diamino-anthraquinone, 1,8-diamino-anthraquinone, and 1,5-diamino-4,8-dihydroxy-anthraquinone, B—NH— is the residue of an amine of a vattable amino-anthraquinone of the group consisting of 1,4-diamino-2-acetyl-anthraquinone, 1-amino - 4 - benzoylamino-anthraquinone, and 4-amino-anthraquinone-1(N), 2-benzacridone, and R is a radical of the group consisting of phenyl and phenoxy.

These dyestuffs are obtained by reacting, in known manner at elevated temperatures, in a high-boiling organic solvent and possibly in the presence of an agent promoting the dehydrohalogenation, 2 mols of a condensation product having the general formula

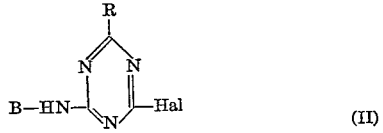

with 1 mol of a diamino-anthraquinone having the general formula $$H_2N—A—NH_2 \quad (III)$$

The process of this invention may also be effected by first preparing in the reaction medium the condensation product of the above-given Formula II by reaction of 1 mol of a dihalogenotriazine having the formula

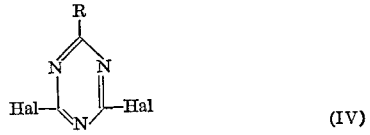

with 1 mol of an amino compound B—NH₂ and by subsequently completing the reaction as described above, after the addition of the diamino-anthraquinone of the Formula III.

Suitable diamino-anthraquinones (III) are, the 1,4-, 1,5-, 1,8-diamino-anthraquinone and the 1,5-diamino-4,8-dihydroxy-anthraquinone.

As amines of a vattable amino-anthraquinone B—NH₂ utilizable under the process of the present invention, there may be mentioned: 1-amino-4-benzoylamino-anthraquinones, 1,4-diamino-2-acetyl-anthraquinone, and 1-amino-anthraquinone-1(N)2, benzacridone.

The reaction is run in a high-boiling solvent or diluent, such as nitrobenzene, o-dichlorobenzene, phenol or mixtures thereof, possibly in the presence of an agent promoting the dehydrohalogenation, such as pyridine, dimethylformamide, etc.

The dyestuffs obtainable under the present invention are valuable vat dyestuffs. They may also be employed as pigments for the dyeing of plastic masses, synthetic fibres and as dyestuffs for lacquers and varnishes. The dyeings obtained with said dyestuffs distinguish themselves by very good fastness properties.

The following examples are given for the purpose of illustrating the present invention. Where not otherwise stated the temperatures given are in degrees centigrade.

EXAMPLE 1

129 grams of the reaction product, obtained from 1 mol 1,4-diamino-2-acetyl-anthraquinone and 1 mol 1-phenoxy-3,5-dichloro-triazine, having a melting point of 258–260° are heated, whilst stirring, for 12 hours at 185°, together with 31.9 grams, 1,4-diamino-anthraquinone in an anhydrous mixture of 1330 cc. nitrobenzene and 106 grams phenol. After cooling down, the reaction product is filtered off with suction, then washed with nitrobenzene and methanol and dried. Yield: 130 grams of a blue dyestuff powder.

From the mother lye an additional small amount of the reaction product may be separated and isolated by means of steam distillation.

The novel dyestuff dyes cotton from a brown-red vat in full navy blue shades that distinguish themselves by good fastness properties, in particular a very good fastness to water drops. The dyestuff may also be employed as pigment dyestuff for the dyeing of lacquers, varnishes, and plastic masses.

Replacing in the above example the 1,4-diamino-anthraquinone by the same amount of 1,5-diamino-anthraquinone or 1,8-diamino-anthraquinone and operating as indicated therein, a black dyestuff powder is obtained that dyes cotton from a red-brown vat in blue-grey shades having very good fastness properties.

If the reaction product of 1 mol 1,4-diamino-2-acetyl-anthraquinone with 1 mol 1-phenyl-3,5-dichlorotriazine is used as starting material and condensed with 0.5 mol 1,4-diamino-anthraquinone, likewise a dyestuff is obtained that dyes cotton from a brown-red vat in full and solid navy blue shades.

EXAMPLE 2

55 grams of the product obtained by reaction of 1 mol 1-amino-4-benzoylamino-anthraquinone with 1 mol 1-phenoxy-3,5-dichlorotriazine are stirred in 200 cc. nitrobenzene at 180° and 205° for 3 hours each time, together with 14.2 grams 1,5-diamino-4,8-dihydroxy-anthraquinone (of a technical grade of 95%). The resultant dyestuff is filtered off with suction in the heat, then washed with nitrobenzene and methanol and dried at 80°. Thus, the dyestuff is obtained in the form of a blue-black powder that dyes cotton from a red vat in violet shades having good fastness properties.

EXAMPLE 3

17 grams (=0.05 mol) 4-amino-anthraquinone-1(N), 2-benzacridone are heated, whilst stirring, for 3 hours at 120°, in 500 cc. nitrobenzene together with 12 grams (=0.05 mol) 1-phenoxy-3,5-dichloro-triazine. Thereafter, 7.1 grams (=0.025 mol) 1,5-diamino-4,8-dihydroxy-anthraquinone are added and the mixture is stirred at 150°, 180° and 210° for 5 hours each time. For working up the reaction mixture, it is cooled down to 120° and filtered off with suction, then the filtration residue is washed with nitrobenzene and methanol and dried. Thus, a blue powder is obtained that dyes cotton from a red vat in bright blue shades.

If the 1,5-diamino-4,8-dihydroxy-antharoquinone in the above example is replaced by 6.0 gams (=0.025 mol) 1,5-diamino-anthraquinone, a dark dyestuff powder is obtained that dyes cotton from a red-violet vat in greenish gray shades.

Using the same amount of 1,4-diamino-antharoquinone, a dyestuff is obtained that dyes cotton from a red-violet vat in a bluish black shade that distinguishes itself by good fastness properties, in particular a good fastness to light.

It will be understood that this invention is susceptible to further modification and, accordingly, it is desired to comprehend such modifications within this invention as may fall within the scope of the appended claim.

I claim:
1. New anthraquinone vat dyestuffs of the formula

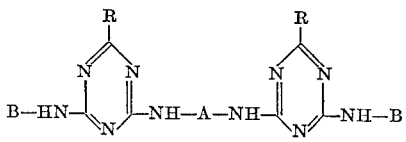

wherein —NH—A—NH— is a bivalent residue of a diamino anthroquinone of the group consisting of 1,4-diamino-anthraquinone, 1,5-diamino-anthraquinone, 1,8-diamino-anthraquinone, and 1,5-diamino-4,8-dihydroxy-anthraquinone, B—NH— is the residue of an amine of a vattable amino-anthraquinone of the group consisting of 1,4-diamino-2-acetyl-anthraquinone, 1-amino-4-benzoyl-amino-anthraquinone, and 4-amino-anthraquinone-1(N), 2-benzacridone, and R is a radical of the group consisting of phenyl and phenoxy.

References Cited

UNITED STATES PATENTS 3,149,100  9/1964  Hindermann et al.
                                260—249 XR
3,226176  12/1965  Hindermann et al.
                                260—249 XR

FOREIGN PATENTS 237,872  1/1926  Great Britain.
962,017  6/1964  Great Britain.
968,468  9/1964  Great Britain.

JOHN D. RANDOLPH, *Primary Examiner.*

J. M. FORD, *Assistant Examiner.*